United States Patent
Walsh

(10) Patent No.: US 12,463,874 B1
(45) Date of Patent: Nov. 4, 2025

(54) APPARATUS AND METHOD FOR DISCOVERING AND LINKING SOFTWARE-DEFINED NETWORKING (SDN) NODE AND NON-SDI NODE IN A COMMUNICATION NETWORK

(71) Applicant: Parry Labs, LLC, Alexandria, VA (US)

(72) Inventor: David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/968,041

(22) Filed: Dec. 4, 2024

(51) Int. Cl.
*H04L 41/122* (2022.01)
*H04L 45/00* (2022.01)

(52) U.S. Cl.
CPC ............ *H04L 41/122* (2022.05); *H04L 45/26* (2013.01)

(58) Field of Classification Search
None
See application file for complete search history.

(56) References Cited

U.S. PATENT DOCUMENTS

| | | | | |
|---|---|---|---|---|
| 9,540,101 | B2* | 1/2017 | Paduano | B64C 9/00 |
| 10,555,238 | B1* | 2/2020 | Wu | H04W 76/14 |
| 11,909,552 | B2* | 2/2024 | Prest | H04L 9/3226 |
| 2016/0028625 | A1* | 1/2016 | Hari | H04L 45/74 |
| | | | | 370/392 |
| 2017/0005919 | A1* | 1/2017 | Wang | H04L 12/64 |
| 2018/0013630 | A1* | 1/2018 | Tatlicioglu | H04L 41/40 |
| 2020/0136932 | A1* | 4/2020 | Jangam | H04L 9/0643 |
| 2023/0156462 | A1* | 5/2023 | Lee | H04W 12/03 |
| | | | | 455/431 |

OTHER PUBLICATIONS

"DOD's Software Acquisition Pathway and Enablement" by Julia Cohen, Aug. 23, 2023, pp. 1-14. Source: https://apps.dtic.mil/sti/trecms/pdf/AD1210419.pdf (Year: 2023).*

* cited by examiner

*Primary Examiner* — Xavier S Wong
(74) *Attorney, Agent, or Firm* — Caldwell Intellectual Property Law

(57) ABSTRACT

An apparatus and method for discovering and linking software-defined networking (SDN) node and non-SDN node in a communication network are disclosed. The apparatus includes at least a processor and a memory communicatively connected to the at least a processor, wherein the memory contains instructions configuring the at least a processor to receive, from a plurality of non-SDN nodes, a discovery message, wherein the discovery message comprises node metadata related to the plurality of non-SDN nodes, identify, by an SDN node, at least one compatible non-SDN node from the plurality of non-SDN nodes based on the discovery message, establish a communication link between the SDN node and the at least one compatible non-SDN node and integrate, by a network controller, the at least one compatible non-SDN node into a communication network.

14 Claims, 9 Drawing Sheets

APPARATUS AND METHOD FOR DISCOVERING AND LINKING SOFTWARE-DEFINED NETWORKING (SDN) NODE AND NON-SDI NODE IN A COMMUNICATION NETWORK

FIELD OF THE INVENTION

The present invention generally relates to the field of communication. In particular, the present invention is directed to an apparatus and method for discovering and linking software-defined networking (SDN) node and non-SDN node in a communication network.

BACKGROUND

SDN allows dynamically management, configuration, and optimization of networks through centralized software controllers, eliminating the need for manual reconfiguration of individual network devices. By centralizing control, SDN allows network administrators to manage the entire network from a single platform. However, SDN faces several challenges that must be addressed to ensure its effectiveness and scalability.

SUMMARY OF THE DISCLOSURE

In an aspect, an apparatus for discovering and linking software-defined networking (SDN) node and non-SDN node in a communication network is disclosed. The apparatus includes at least a processor and a memory communicatively connected to the at least a processor, wherein the memory contains instructions configuring the at least a processor to receive, from a plurality of non-SDN nodes, a discovery message, wherein the discovery message comprises node metadata related to the plurality of non-SDN nodes, identify, by an SDN node, at least one compatible non-SDN node from the plurality of non-SDN nodes based on the discovery message, establish a communication link between the SDN node and the at least one compatible non-SDN node and integrate, by a network controller, the at least one compatible non-SDN node into a communication network.

In another aspect, a method for discovering and linking software-defined networking (SDN) node and non-SDN node in a communication network is disclosed. The method includes receiving, using at least a processor, a discovery message from a plurality of non-SDN nodes, wherein the discovery message comprises node metadata related to the plurality of non-SDN nodes, identifying, using the at least a processor, at least one compatible non-SDN node from the plurality of non-SDN nodes by an SDN node based on the discovery message, establishing, using the at least a processor, a communication link between the SDN node and the at least one compatible non-SDN node and integrating, using the at least a processor, the at least one compatible non-SDN node into a communication network by a network controller.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for discovering and linking software-defined networking (SDN) node and non-SDN node in a communication network are disclosed. The apparatus includes at least a processor and a memory communicatively connected to the at least a processor, wherein the memory contains instructions configuring the at least a processor to receive, from a plurality of non-SDN nodes, a discovery message, wherein the discovery message comprises node metadata related to the plurality of non-SDN nodes, identify, by an SDN node, at least one compatible non-SDN node from the plurality of non-SDN nodes based on the discovery message, establish a communication link between the SDN node and the at least one compatible non-SDN node and integrate, by a network controller, the at least one compatible non-SDN node into a communication network. Exemplary embodiments illustrating aspects of the present disclosure are described below in the context of several specific examples.

Figure 1:
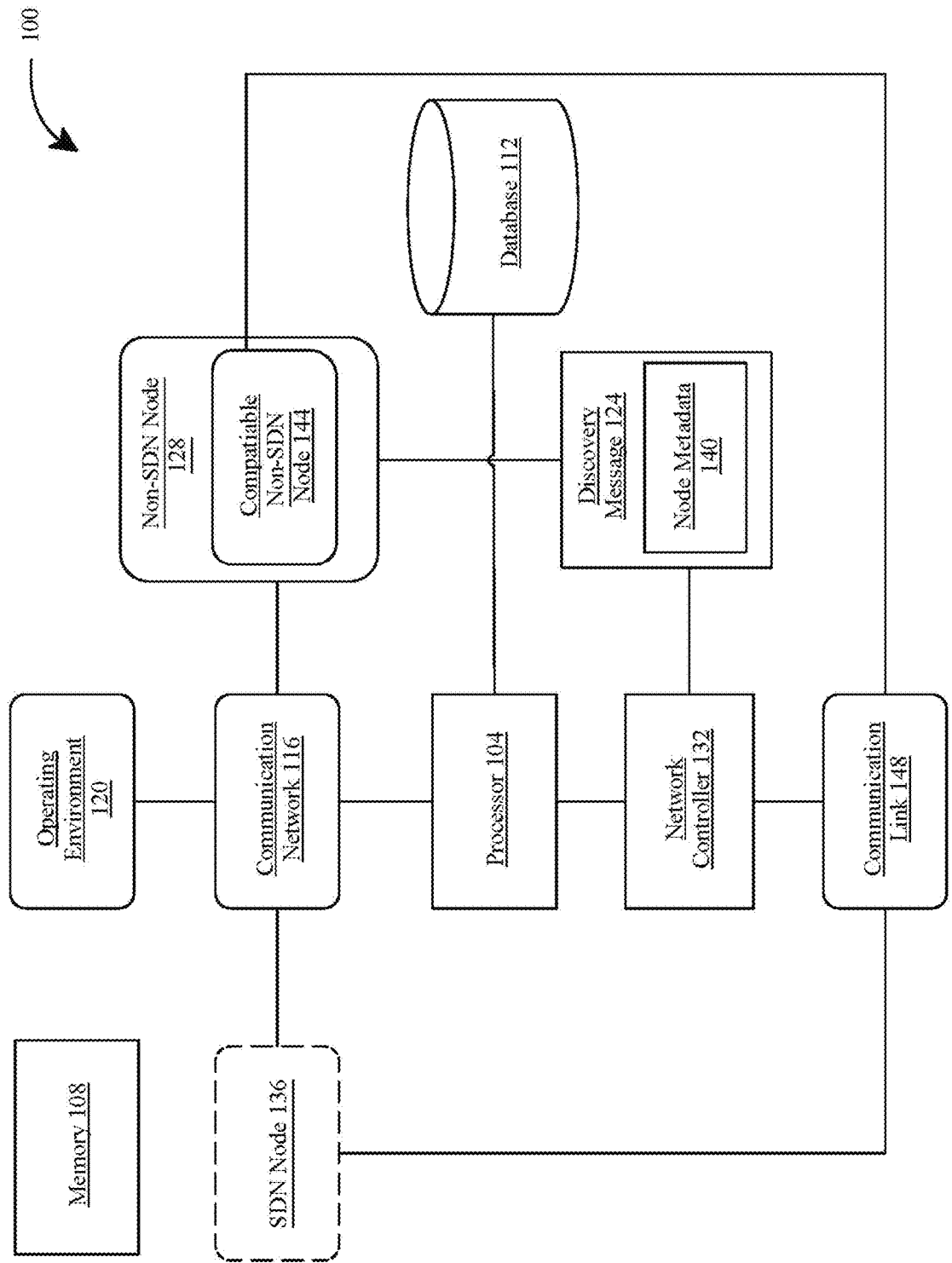
FIG. 1 illustrates a block diagram of an exemplary apparatus for discovering and linking software-defined networking (SDN) node and non-SDN node in a communication network.

Referring now to FIG. 1, an exemplary embodiment of an apparatus 100 for discovering and linking software-defined networking (SDN) node and non-SDN node in a communication network is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/ or system on a chip (SoC) as described in this disclosure.

Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, in one or more embodiments, processor 104 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 104 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 104 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 104 may include a plurality of multi-core processors.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of processor 104, instructions and/or information may be transmitted to primary memory wherein information may be processed. In one or more embodiments, information may only be populated within primary memory while a particular software is running. In one or more embodiments, information within primary memory is wiped and/or removed after processor 104 has been turned off and/or use of a software has been terminated. In one or more embodiments, primary memory may be referred to as "volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

With continued reference to FIG. 1, apparatus 100 may include a database 112. Database may include a remote database 112. Database 112 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 112 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, processor 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system processor 104. In one or more embodiments, processor 104 may transmit processes to server wherein processor 104 may conserve power or energy.

With continued reference to FIG. 1, apparatus 100 may include a host circuit. Host circuit may include at least a processor 104 communicatively connected to a memory 108. As used in this disclosure, a "host circuit" is an integrated circuit or a collection of interconnected circuits designed to manage, control, and/or interface with one or more functionalities in a system. In a non-limiting example, host circuit may be configured as a primary platform or base that provides essential infrastructure, resources, and interfaces to facilitate the operation of other connected or integrated components. Hosting circuit may include any computing device as described in this disclosure, including without limitation a microcontroller, microprocessor, digital signal processor (DSP) and/or system on a chip (SoC) that provide one or more services, resources, or data to other computing devices. Host circuit may include, be included in, and/or communicate with a mobile device such as a mobile telephone or smartphone. Host circuit may include a single computing device operating independently, or may include two or more computing device operating in concert, in parallel, sequentially or the like; two or more computing devices may be included together in a single computing device or in two or more computing devices. In some cases, host circuit may include but is not limited to, for example, a computing device or cluster of computing devices in a first location and a second computing device or cluster of computing devices in a second location. In other cases, host circuit May include a main unit or a primary circuit in a network that controls communications and/or provide a central point of interface. In one or more embodiments, host circuit may be used in lieu of processor 104. In one or mor embodiments, host circuit may carry out one or more processes as described in this disclosure intended for processor 104.

With continued reference to FIG. 1, in or more embodiments, apparatus 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, apparatus 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, apparatus 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, a "communication network" for the purposes of this disclosure is a system that enables the exchange of data between devices or systems. Communication networks 116 may be wired, wireless and/or a combination of both. In one or more embodiments, communication networks 116 may include, but are not limited to, Local area networks. Wide area networks, data center networks, cloud networks, wireless networks, Wi-Fi, 3G, 4G, 5G, Bluetooth, radio access networks, fiber optic networks, satellite networks, microwave networks, ethernet networks, optical transport networks, virtual networks, Tactual data links, satellite communication networks 116 (SATCOM), mobile ad-hoc networks, mesh networks, high-frequency radio networks, edge computing networks, space-based networks and/or any other network in which data may be exchanged.

With continued reference to FIG. 1, an "operating environment" for the purposes of this disclosure refers to the combination of hardware and software that allows a computer software to function or execute. In some embodiments, operating environment 120 may include all systems and conditions related to national security and defense activities, military operations, airborne and ground systems, and the like. For example, and without limitation, operating environment 120 may include an operating system, device drivers, virtual machines, software containers, software modules, executable programs and the like. In one or more embodiments, operating environment 120 may allow for the execution of computer software. In one or more embodiments, operating environments 120 may allow for the execution of software modules and/or software containers. software container may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example, software image may include a portable executable image combined with a manifest file that is used by a container manager as described below to deploy the software image on an operating environment 120 with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics systems, electronic flight bag (EFB) software, ground support equipment software, weather forecasting and reporting software, cockpit display rendering software, and/or the like. In some cases, software image may include a virtual machine image that encapsulate a whole operating system along with one or more pre-installed software applications. Such software may be easily replicated across a plurality of host circuits e.g., servers or cloud environment. In other cases, software image may be used as a backup snapshot to restore/roll back system or a software application to a known working state.

With continued reference to FIG. 1, a "software module" for the purposes of this disclosure, is an application or software that is sought to be executed. For example, and without limitation, software module may include a web browser, word processing software, a media player, a digital calculator, flight systems software, military software and the like. In one or more embodiments, software module may include an application that is sought to be executed within software container. In one or more embodiments, any data and/or information within software container may be used to ensure proper execution of software module. In one or more embodiments, software container may contain libraries, dependencies, and the like to ensure proper execution of software module. In one or more embodiments, software module may include an executable file. In one or more embodiments, software module may include third party application wherein 3rd party applications may include software and/or application created and/or managed by a differing entity. In one or more embodiments, software module may include previously developed applications wherein the previously developed application are modified to interact with a particular environment. In one or more embodiments, software container may allow for a third-party application and/or previously developed application to be deployed within multiple virtual environments and/or operating system. In one or more embodiments, software module may include a previously developed application and/or 3rd party application wherein software module may be placed within software container to allow for software module to operate within multiple environments. A "software container" for the purposes of this disclosure is an executable package that is capable of running software within an isolated space. For example, and without limitation, software container may include a document drafting software wherein the software container may contain any information, runtime environment and the like necessary to execute the document drafting software on more than one operating systems. In one or more embodiments, software containers may create a virtualized environment wherein a software may run within the virtualized environment.

With continued reference to FIG. 1, in one or more embodiments, operating environment 120 may include a virtualized environment. A "virtualized environment," for the purposes of this disclosure is a system in which software may be isolated while still operating on a host operating system. For example, and without limitation, software container may operate in a virtualized environment wherein a software within software container may not communicate with the host operating system. In one or more embodiments, software container may allow for OS virtualization wherein a software may be isolated from a host operating system while still sharing the host operating system kernel. An "operating system (OS) level virtualization," for the purposes of this discourse is a system in which an operating system kernel allows the existence of multiple isolated environment. In OS virtualization, a software within software container may not have access to resources of the host operating system. Instead, the software may only have access to the contents within software container. In one or more embodiments, operating environment 120 may include a host operating system. A "host operating system" for the purposes of this disclosure is a primary operating system running on processor 104. In one or more embodiments, software container may be executed atop host operating system. In one or more embodiments, virtual operating systems may exist atop host operating system. In one or more embodiments, host operating system may include an operating system configured to allow instantiation of one or more software containers, one or more virtual machines and the like. In one or more embodiments, software container may communicate with host operating system to receive resources from processor 104 and/or memory. In one or more embodiments, an ordinary software operating outside of a software container may have access to various operating system resources such as but not limited to, processing capabilities, file systems, networks and the like. In contrast, a software operating within a software container may only have access to the contents within the software container. This may include various files, network capabilities and the like. In one or more embodiments, a software within software container may communicate with software container wherein software container may transmit the commands to the processor 104.

With continued reference to FIG. 1, in one or more embodiments, software container may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container may contain OS level virtualization wherein a software within software container may be executed in a virtualized environment. In one or more embodiments, software container may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database 112, and the like. In one or more embodiments, a software within software container may operate in a runtime environment wherein the software may be isolated from the host operating system. In one or more embodiments, software container may allow for an application to be executed and/or deployed on multiple operating systems. In one or more embodiments, software container may contain libraries, configuration files, binary code and/or any other information that is necessary to execute the application and/or software. In one or more embodiments, a software container may contain some degree of independence from the operating system and/or host system wherein the software container does not rely on the operating system for any information needed to properly deploy an application within software container. In one or more embodiments, operating systems may lack the proper functionalities to execute an application, wherein software container may be used to ensure that any necessary functionalities, information, and the like are self-contained. In one or more embodiments, software container may contain a container image, wherein the container image is a portable executable image combined with a manifest that is used by a container manager to deploy the container image on an operating environment 120 with appropriate data services and restrictions. In one or more embodiments, software container may contain restrictions and/or instructions on how a software may communicate with the operating system in which it is deployed on. In one or more embodiments, software container may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools. In one or more embodiments, software container may include any software container as described in U.S. Nonprovisional application Ser. No. 18/395,210 filed on Dec. 12, 2023 and entitled "SYSTEM AND METHOD FOR A SAFETY CRITICAL OPERATING ENVIRONMENT CONTAINER ARCHI- TECTURE," and U.S. Nonprovisional application Ser. No. 18/443,570 filed on Feb. 16, 2024 and entitled "SYSTEM AND METHODS FOR PROVIDING INTEROPERABLE NETWORKS AND COMMUNICATIONS," the entirety of which are incorporated herein by reference.

With continued reference to FIG. 1, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, memory 108 contains instructions configuring processor 104 to receive a discovery message 124 from a plurality of non-SDN nodes 128. For the purposes of this disclosure, a "discovery message" is a communication packet or signal that a network device sends over a network to announce its presence, capabilities, and willingness to communicate with other network devices. In some embodiments, discovery message 124 from a non-SDN node 128 may be a communication signal or packet that the non-SDN node 128 sends to announce its presence to communication network 116, processor 104 or network controller 132. In one or more embodiments, discovery message 124 may include a request to receive information from SDN node 136 on communication networks 116. In one or more embodiments, SDN node 136 may respond to discovery message 124 with information about capabilities, configuration, status and/or the like. In one or more embodiments, discovery message 124 may include a request for information such as but not limited to, device types, the services offered, the capabilities (e.g. bandwidth, protocols supported, whether the network is active or idle and/or the like.

With continued reference to FIG. 1, discovery message 124 includes node metadata 140 of non-SDN node 128. For the purposes of this disclosure, "node metadata" is data that describes key attributes, properties, or operational details of a non-SDN node. As a non-limiting example, node metadata 140 may include unique identifiers (IDs). Each SDN nodes 136 or non-SDN nodes 128 may have a unique ID or address that is registered with a network controller 132. This ID can be transmitted during discovery and can be cross-referenced with a database 112 managed by network controller 132. As another non-limiting example, node metadata 140 may include supported protocols. Non-SDN node 128 and/or SDN node 136 can advertise the protocols it supports, such as constrained application protocol (CoAP) or modified CoAP for SDN discovery, and/or other SDN-compatible protocols for traffic routing, resource allocation, or AI-based decision-making. The modified CoAP is further described below. For the purposes of this disclosure, a "SDN-compatible protocol" is a communication protocol that is either natively supported by, or can be adapted to, function within a Software-defined Networking (SDN) environment. SDN-compatible protocol may be able to operate alongside SDN nodes 136 and devices in the network. SDN-compatible protocol may allow SDN nodes 136 to communicate with each other and with non-SDN nodes 128. As a non-limiting example, SDN-compatible protocol may include standardization agreement (STANAG) 4586, Link 16, CoAP, modified CoAP, and the like. If a communication network 116 uses a protocol like STANAG 4586, non-SDN devices or nodes that support STANAG 4586 can also participate in the communication network 116 (SDN network). In some embodiments, discovery message 124 may include a message 2261 from STANAG 4586. "Message 2261" for the purposes of this disclosure is used to advertise the presence of STANAG 4586-compliant devices (such as UAVs, ground control stations, and other systems) within a network. Discovery message 124 or Message 2261 can be transmitted on a multicast address to announce relevant network configuration and device capabilities, allowing other devices or nodes in the network to discover and communicate with the sender. For the purposes of this disclosure, a "multicast address" is a type of network address used to deliver data to a specific group of recipients, or group of devices, on a network simultaneously. In some embodiments, receiving discovery message 124 may include receiving the discovery message over a multicast address. As another non-limiting example, node metadata 140 may include capabilities descriptors, such as non-SDN nodes 128 ability to dynamically adjust routing tables, participate in intelligent resource management, or perform real-time data processing at the edge of the network.

With continued reference to FIG. 1, for the purposes of this disclosure, a "software-defined networking (SDN) node" is any device or component within a Software-defined Network (SDN). As a non-limiting example, SDN node 136 may include any device, such as a sensor, edge device, router, or IoT component, that performs data collection, routing, or processing functions. SDN node 136 may be controlled or managed by a network controller 132. For the purposes of this disclosure, a "non-software-defined networking (non-SDN) node" is a network device or system that operates outside the Software-defined Networking (SDN) framework. As a non-limiting example, non-SDN node 128 may include any device, such as a sensor, edge device, router, or IoT component, that performs data collection, routing, or processing functions. For example, and without limitation, non-SDN node 128 may include an older unmanned aerial vehicle (UAV) or legacy sensor system that was built before the SDN architecture was developed. In some embodiments, non-SDN node 128 may be configured for robotics and autonomous command and control (RAC2). For the purpose of this disclosure, "robotics and autonomous command and control (RAC2)" refers to the systems, technologies, and protocols that are used to manage, coordinate, and control robotic and autonomous systems. RAC2 may include unmanned vehicles (air, land, sea), robots, and other autonomous platforms that operate without continuous human intervention.

With continued reference to FIG. 1, "software-defined network (SDN)" for the purposes of this disclosure is a system in which virtual networks can be created to direct traffic on a network, analogously to the way in which virtual machines can be implemented on top of one or more computing devices. In contrast to hardware devices such as routers which may control a network through hardware, SDN may be used to control a network through software. In one or more embodiments, SDN may be used to control a network wherein data packets may be routed using SDN. In one or more embodiments, SDN may act as an intermediary between an application or software and a network wherein the SDN may control the software interacts with the network. SDN may be used to monitor and control network conditions. In one or more embodiments, SDN may be used to manage network resources for various software containers or operating environments. Software containers may be limited in network resources due to their level of importance; such that less important software containers do not crowd a network for less important matters. In some embodiments, SDN may include Software-defined intelligent network (SDIN). "Software-defined intelligent network (SDIN)" for the purposes of this disclosure is an SDN which utilizes artificial intelligence and machine learning to optimize the performance of a network. In SDIN, machine learning may be used to predict issues, predict network demands and adjust the network accordingly. In some cases, SDIN may be used to ensure that software containers or operating environments do not interact with one another. A network controller may be used to interact with a network. The network controller may monitor network traffic and make decision to optimize traffic for software container. In one or more embodiments, SDN may ensure enable dynamic mesh networks, and facilitate assured, secure data sharing across and/or using such as interface protocols as Link-16, BFT, STANAG 4586, Robotics and Autonomous Command and Control RAC2, Micro Air Vehicle Link (MavLink), data distribution system (DDS), Unmanned Aerial Vehicle Communication and Navigation (UAVCAN), scalable control interface (SCI), Aeronautical Mobile Airport Communication System (AcroMACS), or the like. While SDN offers centralized control and programmability, SDIN builds upon foundational principles of SDN but incorporates AI, machine learning, and context-awareness to create a more self-managing, autonomous network.

With continued reference to FIG. 1, in one or more embodiments, SDIN may be a "smart" networking layer that may dynamically manage the connectivity and data flow between different system components, applications, partitions, and/or the like based on certain criteria. In some cases, SDN or SDIN may include a network controller 132 that control communication between a plurality of SDN nodes 136 or between SDN nodes 136 and non-SDN nodes 128. In some cases, SDIN may dynamically alter the connectivity between system components based on predefined rules, operational requirements, and/or real-time assessments. In some cases, SDN or SDIN may be configured to enforce one or more network polices that dictate how partitions interact, what bandwidth partitions are allocated, which partitions are permitted to communicate, and/or the like. In some cases, SDN or SDIN may communicate with container manager that continuously monitor the activity of each partition, and adjust connections between plurality of SDN nodes 136 or between SDN nodes 136 and non-SDN nodes 128. In some cases, adjusting connections between plurality of or nodes may be based on compliance matrix. In a non-limiting example, network controller 132 may be configured to selectively connect and/or disconnect nodes as a function of compliance matrix (e.g., compliance status). If compatible non-SDN node 144 is found to be non-compliant with one or more safety standards, network controller 132 of SDN or SDIN may selectively disconnect or isolate non-SDN node 128 from the rest of system to prevent potential harm or interference with compliant partitions (e.g., SDN node 136 and plurality of non-SDN node 128). In some cases, adjustments of connectivity may include reconfiguring and/or updating compatible non-SDN node 144 to bring it back into compliance before restoring its connectivity. This may be done, for example and without limitation, through one or more rollback operation which returns compatible non-SDN node 144 to a previous compliant state. Additional disclosure related to SDN and SDN nodes may be found in U.S. Nonprovisional application Ser. No. 18/395,149, filed on Dec. 22, 2023, and entitled "APPARATUS AND METHOD FOR PROVIDING A SAFETY-CRITICAL OPERATING ENVIRONMENT (SCOE)," the entirety of which is incorporated herein by reference.

With continued reference to FIG. 1, in one or more embodiments, SDN or SDIN may employ machine learning module which implementing one or more machine learning algorithms to predict and respond to network needs, detect anomalies that may indicate non-compliance, and automatically reconfigure connections for desired performance and safety. In a non-limiting example, one or more machine learning models may be generated by machine learning module within SDN or SDIN to predict potential compliance violations and proactively adjust connections before actual violations occur. In some cases, when compatible non-SDN node 144 becomes non-compliant, SDN or SDIN may automatically initiate procedure to bring it back into compliance such as triggering a security scan for vulnerabilities, or a configuration update. For example, in an avionics system designed with modular architecture as described herein, wherein each second partition of a plurality of second partitions integrated into the system performs a distinct function-navigation, communication, in-flight entertainment, weaponry, and/or the like. These partitions may be interconnected by virtual bus as described above, wherein the SDN or SDIN may have privileges to configure hypervisor to manage virtual bus connection between plurality of SDN nodes within virtual environment through virtualization layer. During a routine check, SDN or SDIN may detect that in-flight entertainment system may be running outdated software that may have one or more vulnerabilities. In order to prevent any potential risk to aircraft's operations, SDN or SDIN may be configured to immediately disconnect in-flight entertainment system so that it may no longer communicate with navigation or communication modules. In some cases, SDN or SDIN may reroute passenger devices to a limited network that keeps them disconnected from main avionics but allows for basic functionality such as internet browsing capabilities. In some cases, machine learning module may lean from historical incident and updates one or more predictive machine learning models to better anticipate potential compliance lapses. In other cases, users e.g., pilots, technicians, network administrators, passengers may provide user feedback to support SDN or SDIN's decision making; for example, user may choose to "trust" or "don't trust" a software module. In some cases, machine learning module may adapt to user feedback to adjust models' parameters, thereby reducing false positives or be more aligned with user expectations and expertise.

With continued reference to FIG. 1, additionally, or alternatively, SDN or SDIN may be configured to direct traffic on a network. In contrast to hardware components such as routers which may control a network through hardware, SDN or SDIN may be used to dynamically control a network through communication network 116. In one or more embodiments, SDN or SDIN may be used to control a network wherein data packets may be routed using SDN or SDIN. In one or more embodiments, SDN or SDIN may act as an intermediary between software application or software and a network wherein the SDN or SDIN may control the software module interacts with the network. In some cases, SDN or SDIN may be used to monitor and control network conditions. In one or more embodiments, SDN or SDIN may be used to manage network resources for at least one container. In some cases, at least one container may be limited in network resources due to their level of importance; such that container running less important software image do not crowd a network for less important matters. In a non-limiting example, SDN or SDIN may ensure an enablement of one or more dynamic mesh networks, and facilitate assured, secure data sharing across Link-16, BFT, 4586, and RAC2.

With continued reference to FIG. 1, for the purposes of this disclosure, a "network controller" is a system responsible for controlling the behavior of one or more communication networks. In some embodiments, network controller 132 may include central SDIN controller or central SDN controller. In one or more embodiments, network controller 132 may receive data that is ready for transmission and make routing decisions based on the state of current networks that are available. In one or more embodiments, network controller 132 may dictate policies for a particular communication network. In one or more embodiments, network controller 132 may monitor network traffic, utilization, bandwidth security issues and/or the like. Network controller 132 can orchestrate and manage communication, operation, and resource allocation of all the devices and nodes within the SDIN network or SDN network. Network controller 132 can make real-time decisions about how the network operates, based on the data it receives from the various nodes. In a non-limiting example, network controller 132 may make decisions about how the network operates based on a web transfer protocol. In one or more embodiments, network controller 132 may include a virtual network controller, wherein the virtual network controller may include a virtualized software emulating a network controller 132. In one or more embodiments, virtual network controller may transmit discovery messages 124 based on the network type it is addressing. For example, and without limitation, a particular discovery message 124 may be made for a radio network and a differing discovery message 124 may be made for an ethernet based network. A "web transfer protocol" as described in this disclosure is a network protocol used to identify and gather information about devices and their connections within networks. Additional disclosure related to a web transfer protocol may be found in U.S. Nonprovisional application Ser. No. 18/967,861, filed on Dec. 4, 2024, and entitled "APPARATUS AND METHOD FOR DISCOVERING AND LINKING SOFTWARE-DEFINED NETWORKING (SDN) NODES IN A COMMUNICATION NETWORK IN OPERATING ENVIRONMENTS," the entirety of which is incorporated herein by reference.

With continued reference to FIG. 1, network controller 132 and/or processor 104 may be configured to identify, by an SDN node 136, at least one compatible non-SDN node 144 based on discovery message 124. In a non-limiting example, non-SDN node 128 may communicate with SDN nodes 136 through compatible protocols such as STANAG 4586, Link 16, or CoAP. These protocols may ensure that while non-SDN node 128 is not part of the SDN or SDIN infrastructure, it can still share data and coordinate activities with SDN nodes 136. For the purposes of this disclosure, a "compatible non-SDN node" is a network device or system that is not fully integrated into the Software-defined Networking (SDN) framework yet but can communicate and interoperate with SDN nodes. In one or more embodiments, network controller 132 may identify a particular communication network 116 in which data may be routed through. Compatible non-SDN node 144 may have shared communication protocols, standards, or interfaces, enabling non-SDN node 128 to participate in certain network activities, such as data exchange, task execution, or system coordination, even though it does not possess the full dynamic control and programmability features of an SDN node 136.

For example, and without limitation, unmanned aerial vehicle (UAV) (compatible non-SDN node 144) that uses STANAG 4586 can still communicate with SDN or SDIN ground control stations despite not being part of the SDN or SDIN network itself. In some embodiments, compatible non-SDN node 144 may not support the centralized dynamic control provided by the SDN or SDIN controller (network controller 132), meaning it may operate more autonomously or in a semi-static manner; however, compatible non-SDN node 144 may receive specific commands, such as tasking instructions, and respond to them. In a non-limiting example, a non-SDN radar station (compatible non-SDN node 144) can send surveillance data to an SDN system but might not be remotely reconfigured by the SDN controller.

With continued reference to FIG. 1, a "network device" for the purposes of this disclosure is a computing device and/or physical or virtual component thereof that is communicatively connected to apparatus 100 by a network connection. In one or more embodiments, network device may enable communication between processor 104 and a communication network 116. In one or more embodiments, network devices may include but are not limited to routers, switches, hubs, Access points, modems, gateways, bridges, network interface cards, proxy servers, DNS servers, satellite modems, satellite dish, radio transceivers, microwave antennas, cellular modems, cellular towers, radio gateways, equipment for radio access networks and/or any other devices that may allow processor 104 to communicate through a communication network 116. In one or more embodiments, network controller 132 may identify network devices in order to determine a particular communication network 116 and/or path for data. In one or more embodiments, network controller 132 may utilize a link layer discovery protocol (LLDP) in order to identify non-SDN node 128 on or more communication networks 116. "Link layer discovery protocol" as described in this disclosure refers to a network discovery protocol that is used to detect neighboring nodes in a network. In one or more embodiments, network controller 132 may dynamically discover devices by identifying LLDP messages that have been transmitted from said devices. In one or more embodiments, network controller 132 may identify non-SDN node 128 or SDN node 136 on communication network 116 through discovery protocols such as but not limited to, modified web transfer protocol, CoAP, openflow, simple network management protocol, network agents operating on non-SDN node 128 or SDN node 136, through Application program interfaces and/or the like. In one or more embodiments, network controller 132 may be configured to identify virtual networks operating on processor 104. In one or more embodiments, network controller 132 may identify network switches, virtual switches, virtual network interfaces, overlay networks and/or the like, wherein network controller 132 may communicate with the virtual devices.

With continued reference to FIG. 1, network devices (e.g., network device, non-SDN node 128, and the like) may include and/or be associated with one or more disparate networks. A "disparate network" for the purposes of this disclosure refers to a network that differs in architecture, protocols, technologies or management structures in comparison to another network. For example, and without limitation, disparate networks may include a Wi-Fi network in comparison to Bluetooth. In one or more embodiments, disparate networks may include networks with differing protocols, networks with different routing mechanisms and/or the like. In one or more embodiments, network devices may include disparate networks wherein network devices may operate on a network differing from that of operating environment 120, processor 104 and/or the like. In one or more embodiments, network device may include a disparate network wherein data transmitted from operating environment 120 may be transmitted using differing network protocols, differing technologies and/or the like. In one or more embodiments, network devices may include disparate networks wherein communication networks 116 may differ in protocols, technologies and/or the like. In one or more embodiments, disparate networks may include any communication networks 116 as described in this disclosure which differ in protocol, technology, structure and/or the like.

With continued reference to FIG. 1, network controller 132 may be used to facilitate communication between disparate networks. For example, and without limitation, network controller 132 may utilize virtual network overlays to allow resources from disparate networks to interact with one another. In one or more embodiments, virtual network interface may emulate a particular network, wherein network controller 132 may receive data from the virtual network interface and convert data in a format suitable for a disparate network. In one or more embodiments, network controller 132 may be configured to manage multiple disparate networks.

With continued reference to FIG. 1, memory 108 contains instructions configuring processor 104 to establish a communication link 148 between SDN node 136 and at least one compatible non-SDN node 144 and integrate, by a network controller 132, the at least one compatible non-SDN node 144 into a communication network 116. For the purposes of this disclosure, a "communication link" is an established communication pathway, such as a communicative connection, through which a SDN node and compatible non-SDN node exchange data, commands, or status information. Communication link 148 may allow SDN node 136, which operates within a Software-defined Networking (SDN) framework, to interact with a compatible non-SDN node 144 that uses compatible protocols (web transfer protocol). In some embodiments, establishing communication link 148 may include transmitting, by SDN node 136, a response to compatible non-SDN node 144 as a function of discovery message 124. After receiving discovery message 124, SDN node 136 may assess the content of the discovery message 124 (such as the node's identity, supported protocols, and capabilities) and send a response. As a non-limiting example, a response can confirm receipt of discovery message 124, validating the non-SDN node 128 to ensure secure communication and setting up communication link 148 so that data can start flowing between the SDN and non-SDN nodes. In some embodiments, communication link 148 may ensure secure data transmission between SDN node 136 and compatible non-SDN node 144 using encryption, authentication, and access control mechanisms to protect the integrity and confidentiality of the data being exchanged. In some embodiments, communication link 148 may be either bidirectional, allowing data to flow both ways or unidirectional, where data flows in only one direction. As a non-limiting example, commands may be sent from SDN node 136 and status updates may be sent from compatible non-SDN node 144. For example, and without limitation, a bidirectional link where the SDN controller sends tasking instructions to a non-SDN drone (compatible non-SDN node 144), and the drone (SDN node 136) sends telemetry data back.

With continued reference to FIG. 1, in some embodiments, establishing communication link 148 may include determining a routing path between SDN node 136 and at least one compatible non-SDN node 144. A "routing path"

for the purposes of this disclosure refers to a route in which data travels from a source to a destination. For example, and without limitation, routing path may include one or more network devices which may relay data from a source to a destination. In some embodiments, the data that can be relayed between network devices may include transmission data. "Transmission data" for the purposes of this disclosure is information that is to be transmitted from one device to another. In one or more embodiments, routing path may include multiple network devices which may receive and transmit data, one or more communication networks 116 that are selected for transmission, and/or one or more particular connections between the network devices that allow for transmission and/or the link. In one or more embodiments, routing path may include the particular type of communication network 116 data is transmitted on. For example, and without limitation, routing path may include the use of a cellular network, the use of W-fi, the use of a radio network and/or the like.

With continued reference to FIG. 1, in one or more embodiments, processor 104 may utilize predictive modeling, adaptive modeling, selection of nodes and the like as a function of a machine learning model. The machine learning model may include any machine learning model as described in this disclosure. Processor 104 may use a machine learning module, such as a node machine learning module for the purposes of this disclosure, to implement one or more algorithms or generate one or more machine-learning models, such as a node machine learning model to determine one or more paths for data to be transmitted along. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 112, such as any database 112 described in this disclosure, or provided by a user. In other embodiments, a machine-learning module may obtain a training set by querying a communicatively connected database 112 that includes past inputs and outputs. Training data may include inputs from various types of databases 112, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as node machine learning module, may be used to create node machine learning model and/or any other machine learning model using training data. Node machine learning model may be trained by correlated inputs and outputs of training data. Training data may be data sets that have already been converted from raw data whether manually, by machine, or any other method. Node training data may be stored in database 112. Node training data may also be retrieved from database 112. In some cases node machine learning model may be trained iteratively using previous inputs correlated to previous outputs. For example, processor 104 may be configured to store routing paths and their corresponding transmission from current iterations to train the machine learning model. In some cases, the machine learning model may be trained based on user input. For example, a user may indicate that determined paths or routing paths were unreliable and/or slow wherein the machine learning model may be trained as a function of the user input. In some cases, the machine learning model may allow for improvements to processor 104 such as but not limited to improvements relating to comparing data items, the ability to sort efficiently, an increase in accuracy of analytical methods and the like. In one or more embodiments, node training data may include a plurality of source nodes and destination nodes correlated to a plurality of node paths. In one or more embodiments source nodes and destination nodes may be determined based on the source of the transmission (i.e., processor 104 and/or a central server) and the destination of the transmission (i.e. operating environment 120). In an embodiment, node path may include a route from a source node to a destination node. In one or more embodiments, node machine learning model may be configured to output node paths based on source nodes and destination nodes. In one or more embodiments, node machine learning model may be trained using historical data such as transmissions made on previous iterations. In an embodiment, historical data may indicate the most optical node paths between source node and destination node. In one or more embodiments, following each iteration of the processing of apparatus 100, node paths and their corresponding transmission time may be used to iteratively train machine learning model in order to create more efficient node paths. In one or more embodiments, training of node machine learning model may allow for selection of more efficient node paths and may increase the reliability of a transmission.

With continued reference to FIG. 1, additional disclosure related to routing path and transmission data may be found in U.S. Nonprovisional application Ser. No. 18/910,426, filed on Oct. 9, 2024, and entitled "SYSTEMS AND METHODS FOR COMMUNICATION BETWEEN REMOTE ENVIRONMENTS" and U.S. Nonprovisional application Ser. No. 18/968,229, filed on Dec. 4, 2024, and entitled "METHODS AND SYSTEMS FOR NETWORK PATH GENERATION," the entirety of which is incorporated herein by reference.

With continued reference to FIG. 1, in some embodiments, integrating compatible non-SDN node 144 may include receiving discovery message 124 from at least one network device, authenticating the at least one network device and registering the at least one network device as non-SDN node 128 to a network controller 132. In some embodiments, integrating the at least one compatible non-SDN node 144 may include authenticating the at least one compatible non-SDN node 144 and registering the at least one compatible non-SDN node with network controller 132. In a non-limiting example, when a network device, such as a sensor, router, or other IoT device, is introduced into communication network 116, it sends a discovery message 124 to announce its presence and network controller 132 listens for discovery message 124 to detect new devices (e.g., non-SDN node 128) joining the communication network 116. Once the discovery message 124 is received, continuing the non-limiting example, the network controller 132 authenticates the network device to ensure it is legitimate and authorized to join the communication network 116 by verifying the network device's credentials, such as an authentication token, security certificate, or other forms of secure identity data included in the discovery message 124. After authentication, further continuing the non-limiting example, the network device is registered as a non-SDN node 128 with the network controller 132 by assigning the network device a unique role or profile within the communication network 116. The network controller 132 can then integrate this non-SDN node 128 into its centralized control system, allowing it to communicate with other SDN nodes and participate in network operations. Once registered, network device becomes part of the SDN system and can be managed, monitored, and controlled by network controller 132.

With continued reference to FIG. 1, in some embodiments, establishing communication may include establishing peer-to-peer communication between SDN node 136 and at least one compatible non-SDN node 144. For the purposes of this disclosure, "peer-to-peer (P2P) communication" is a network communication model in which two or more devices directly interact with each other without the need for a centralized server or controller. In a P2P network, each device can act as both a client and a server, meaning that it can both request and provide resources or services.

With continued reference to FIG. 1, the communication link may include a Link 16 protocol. In a non-limiting example, the Link 16 communication link may use a Variable Message Format (VMF). As used in this disclosure, "Variable Message Format (VMF)" is a standardized digital message protocol that enables the exchange of tactical data and information in military and defense communications systems. Without limitation, the VMF may be widely used for the transmission of messages among diverse systems, allowing for rapid, reliable, and interoperable data communication in tactical environments. For example, without limitation, when the Link 16 utilizes VMF, data is transmitted in a standardized digital message format designed for tactical data exchange among various systems. Continuing, this may facilitate rapid, reliable, and interoperable communication across military networks, ensuring effective message dissemination and improved situational awareness.

Additionally and or alternatively, the Link 16 communication link may use the Cursor on Target (COT) protocol. As used in this disclosure, "Cursor on Target (COT)" is a communication protocol and format that facilitates the transmission of situational data. For example, COT protocol may include geospatial coordinates or targeting information, across multiple platforms. Continuing, the COT protocol may be designed for low-latency, high-precision data sharing, providing a common operational picture for users across different systems and organizations. Without limitation, utilizing COT, Link 16 enables the transmission of situational data, like geospatial coordinates or targeting information, with a focus on precision and low latency. Continuing, this may enhance situational awareness and operational response by rapidly sharing critical mission data among multiple platforms. The integration of COT allows Link 16 to deliver precise targeting information and maintain a real-time common operational picture, further boosting mission coordination and responsiveness.

Figure 2:
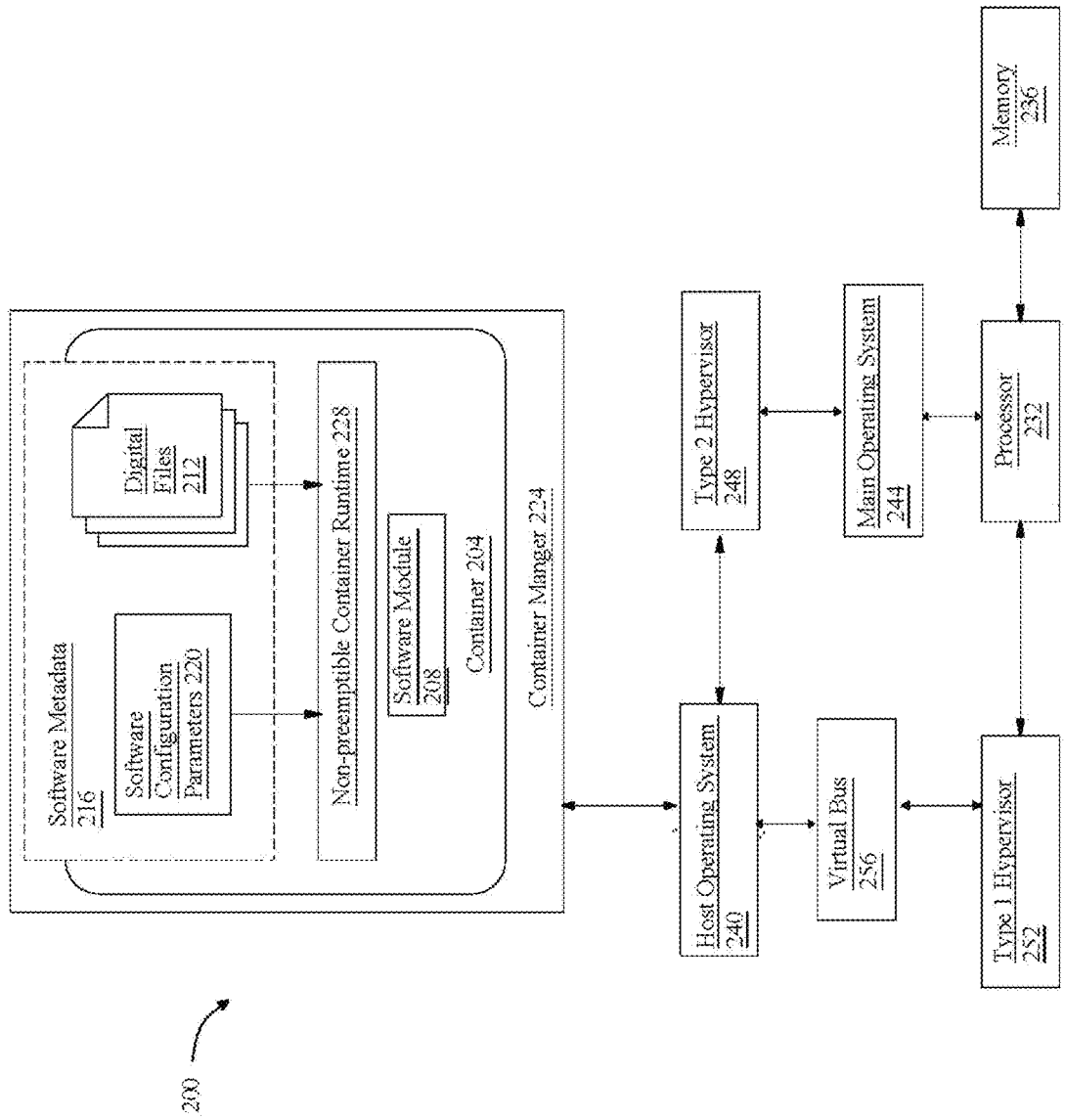
FIG. 2 illustrates a block diagram of a system illustrating a software container in communication with one or more hardware components.

Referring now to FIG. 2, an exemplary embodiments of a system 200 illustrating a container 204 in communication with one or more hardware components is described. Container 204 may include a container such as software container as described in reference to FIG. 1. In an embodiment, a software module 208 may be designed to be reusable and to provide certain functionality that may be integrated into one or more different operating systems or larger software applications. In one or more embodiments, container 204 may allow for software module 208 to be reused on multiple operating systems. In one or more embodiments, container 204 may ensure that any dependencies, libraries and the like needed by software module may be retrieved from within container 204. In one or more embodiments, container may include code, runtime, system tools, system libraries, configurations, and/or the like. In some cases, at least container 204 may provide a "second layer" isolation or protection from a host operating system, environment and other containers and/or partitions. In one or more embodiments, container 2204 may include a standard unit of software that packages up code and all its dependencies such that software module 208 may run under a desired performance from one standard operating environment to another. In one or more embodiments, container contain digital files 212, wherein the digital files 212 contain dependencies, libraries, and/or any other information that may be used to ensure containment of software module 208. In one or more embodiments, instantiating software module 208 into container 204 may include extracting software metadata 216 from software module 208 wherein the software metadata 216 may include a plurality of software configuration parameters 220 and a plurality of digital files 212. As used in this disclosure, "software metadata" is information related to software module 208. In a non-limiting example, software metadata may include a manifest file specifying software version number, required dependencies, configurations and/or the like. As described herein, "software configuration parameters" are parameters that dictate how software module 208 should be set up within a particular standard operating environment (SOE). Exemplary software configuration parameters 220 may include, without limitation, one or more environment variables, service endpoints, port numbers, paths to necessary libraries or dependencies, and/or other configuration data necessary for software module 208 to operate in any virtual environment. In one or more embodiments, a container manager 224 may manage execution of container. In one or more embodiments, container manager 224 may be configured to manage container and ensure that software module 208 operates in an isolated environments. This may be done, for example, by setting up correct file paths, configuring virtual network settings, installing required libraries, and/or the like based on plurality of software configuration parameters 220. Integrating software module 208 may further include deploying plurality of digital files 212 within the initialized container 204. Container manager 224 may place plurality of digital files 212 in correct directories, setting permission, prepare container agent to execute plurality of digital files. In some cases, container agent may load at least one operational rule into non-preemptible container runtime 228, such as a non-preemptible runtime as described above. In cases where container 204 is running at RTOS, certain level of service or response time may be guaranteed. In one or more embodiments, in instances in which container 204 contains a contain-runtime a container manager may not be needed. In a non-limiting example, at least one container 204 may be granted access to at least a processor 232, memory 236, and other resources as described above. Once software module 208 is running, it may have exclusive access to dedicated resources until it completes execution or a conclusion. Exemplary embodiments of at least one container 204 may include a DOCKER container (that encapsulate any payload and dependencies into a single object", RTOS container, safety-certified container (designed to meet stringent certification requirements of regulatory bodies such as, without limitation, FAA or EASA), among others.

With continued reference to FIG. 2, container 204 and/or container manager may communicate directly with a host operating system. In one or more embodiments, in instances in which contain 204 is managed by container manager 224, container manager may communicate with a host operating system 240 wherein the host operating system may transmit the communication to processor 232 and/or memory. In one or embodiments, in instances in which container 204 contains a container-runtime the container run time may communicate with the host operating system 240. In one or more embodiments, the host operating system 240 may include the operating system in which container 204 and/or container manager is running on. In one or more embodiments, host operating system 240 may include a virtual environment located atop a primary operating system and/or a virtual environment in direct communication with hardware components. In one or more embodiments, host operating system 240 may run atop a main operating system 244, wherein the main operating system 244 may include the primary operating system of the computing device and the host operating system 240 may include the virtual environment generated by a virtual machine. In instances in which host operating system may be created atop main operating system 244, a type 2 hypervisor 248 may be used to create a virtualization layer atop main operating system 244. In one or more embodiments, a host operating system 240 may communicate with type 2 hypervisor 248 wherein type 2 hypervisor 248 may communicate with main operating system 244 wherein main operating system may communicate with processor 232 and/or memory 236. In one or more embodiments, in instances in which host operating system does not run atop main operating system 244, type 1 hypervisor 252 may be configured to create a virtualization layer atop the hardware components such as processor and/or memory 236. In one or more embodiments, a virtual bus 256 may allow for communication between host operating system 240 and processor 232. In one or more embodiments, a type 1 hypervisor may allow for increased isolation wherein host operating system 240 may communicate directly with processor. In one or more embodiments, in a type 23 hypervisor, host operating system 240 must first communicate with virtualized components of type 2 hypervisor 248 wherein type 2 hypervisor may communicate with main operating system 244 and finally main operating system 244 may communicate with processor 232.

Figure 3:
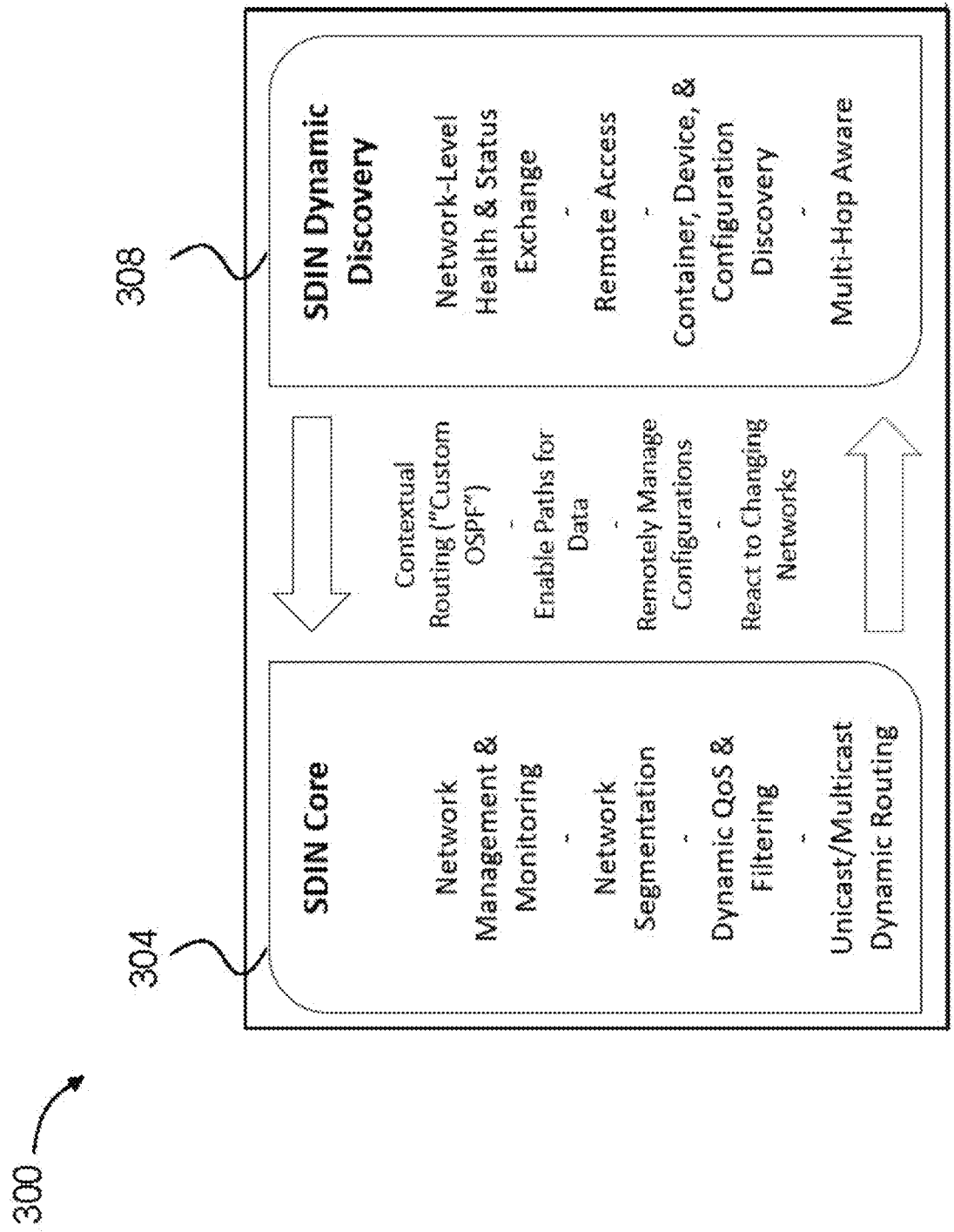
FIG. 3 illustrates a diagram of an exemplary embodiment of a network controller architecture.

Referring now to FIG. 3, an exemplary embodiment of a network controller architecture 300 is described. In one or more embodiments, network controller architecture 300 may include any network controller as described in this disclosure. In one or more embodiments, network controller architecture 300 may include a software-defined intelligent network. In one or more embodiments, network controller architecture 300 may include an SDIN core 304. An "SDIN core" as described in this disclosure refers a central management framework of a network controller that controls and orchestrates network resources using software-defined networking principles. In one or more embodiments, the SDIN 304 core may be responsible for network management and monitoring. In one or more embodiments, SDIN core 304 may gather information from various discovery sources to determine the capabilities of networks and how they continuously change. In one or more embodiments, a network controller may routinely and/or iteratively send discovery requests in order to determine what network devices are connected to a system. In one or more embodiments, the SDIN core 304 is responsible for managing networks, creating flow rules, updating flow tables, allocating resources and/or the like. In one or more embodiments, SDIN core 304 may be responsible for identifying trends, performance metrics, potential issues and/or the like. In one or more embodiments, the SDIN core 304 is responsible for network segmentation. In one or more embodiments, network segmentation may include the allocation of resource, the isolating of transferred data throughout a network, the virtualization or partitioning of networks in order to isolate information and/or the like as described in reference to at least FIG. 1. In one or more embodiments, SDIN core 304 may be responsible for dynamic QOS and filtering. Dynamic QOS and filtering refers to the ability to adjust network performance parameters in real-time based on changing network conditions, application requirements, user demands and/or the like. In one or more embodiments, dynamic QOS and filtering may ensure that transmission receive the resource they critically needed. In one or more embodiments, dynamic QOS and filtering may ensure that transmission having high transmission priorities are prioritized on a networks. In one or more embodiments, SDIN core 304 may be responsible for dynamic routing, wherein SDIN core 304 may identify the best possible routes for a transmission to take. In one or more embodiments, SDIN core 304 may engage in unicast routing wherein each packet or transmission is addressed to a specific device or destination. In one or more embodiments, SDIN core 304 may be responsible for multicast routing wherein transmission such as transmission data are sent to multiple receivers simultaneously. In one or more embodiments, multicast routing may include the use of multiple network devise in order to ensure that a particular network device does not become overwhelmed by a large file. In one or more embodiments, multicast routing may include the use of multiple routing paths in order to prevent overuse on a particular network device. In one or more embodiments, SDIN core 304 may receive information from various discovery resources and make decisions for the network. In one or more embodiments, SDIN core 304 may create paths for data, manage configurations for transmission and react to changing networks.

With continued reference to FIG. 3, network controller architecture 300 may include dynamic discovery 308. "Dynamic discovery:" for the purposes of this disclosure refers to the capabilities of a network controller to detect and identify devices, services or applications within a network. In one or more embodiments, dynamic discovery 308 may allow for the identification of network devices and their capabilities, recognize new device, monitor changes in network devices, monitor security and/or the like. In one or more embodiments, dynamic discovery 308 may be used by SDIN core 304 in order to make decisions. In one or more embodiments, dynamic discovery 308 may allow for the identification of network devices and network capabilities such that SDIN core 304 may make decisions. In one or more embodiments, dynamic discovery 308 may allow for remote access wherein discovery requests may be transmitted from a remote location and information may be transmitted from network devices, such as, for example, congestion datum. In one or more embodiments, dynamic discovery may allow for multi-hop awareness wherein a network controller may contain the capability to manage data transmission across multiple intermediate nodes before reaching its final destination. In one or more embodiments, multi-hop aware may be used to identify the most efficient paths from a source to destination. In one or more embodiments, multi-hop aware may allow for dynamic routing mechanisms in order to meet the changes of changing network conditions.

Figure 4:
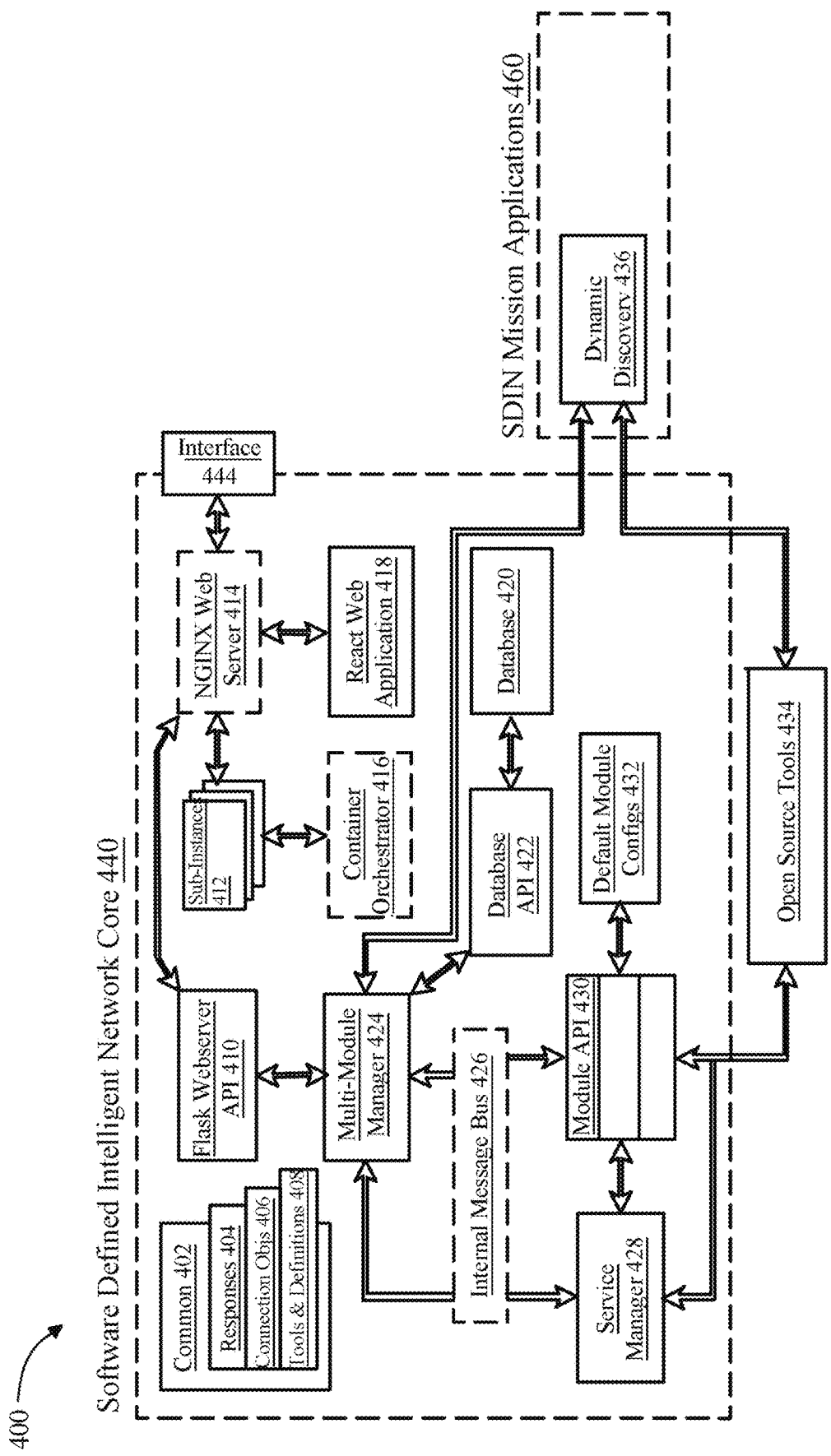
FIG. 4 illustrates a diagram illustrating an exemplary embodiment of a container architecture.

Referring now to FIG. 4, an exemplary embodiment of a container architecture 400 is described. In one or more embodiments, container architecture includes a software-defined intelligent container (SDIN) core 440. In one or more embodiments, SDIN core 440 may be consistent with SDIN core as described in reference to FIG. 6. In one or more embodiments, SDIN core 440 may be responsible for receiving data and decision making. In one or embodiments, SDIN core may contain commonality or common 402 elements across various components of the SDIN. In one or more embodiments, commonality between software-defined intelligent networks include responses 404. In one or more embodiments responses 404 or actions by SDIN core may be similar. In one or more embodiments, responses 404 may SDIN core 440 may include dynamic resource allocation based on network demands, network monitoring and the like. In one or more embodiments, commonality among SDIN cores may include connection objectives 406. In one or more embodiments, connection objectives may include interoperability, wherein the SDIN may ensure that various system and components can communicate with one another, network performance optimization and/or the like. In one or more embodiments, common elements 402 may further include similar tools and definitions 408. In one or more embodiments, similar tools and definitions 408 may include similar operational definitions, similar software used to control the SDIN and/or the like.

With continued reference to FIG. 4, SDIN core 440 may include a flask webserver API 410. In one or more embodiments, flask webserver API may include a web application framework built using flaks, which is designated to create and manage application programs interfaces (API). Flask may be used to create RESTful APIs, which allow different components of the SDIN to interact over HTTP using standard methods like GET, POST, PUT, and DELETE. The API may enable the exchange of data between the SDIN core 440 and external systems or applications. In one or more embodiments, a NGINX web server 414 can route requests to flask APIs based on defined rules, wherein the Flask API may focus on application logic rather than request handling. This may allow for improved system performance under heavy loads. In one or more embodiments, a multimodule manager 424 may facilitate management of modules such that all required components of a Flask API are loaded and configured correctly. In one or more embodiments, a database API 422 retrieved from a database 420 may provide multimodule manager 424 with consistent data interactions amongst multiple modules. In one or more embodiments, each module can utilize database API to perform data operations. In one or more embodiments, a multimodule manager may management multiple modules within an SDIN core 440. In one or more embodiments, A react web application 418 may allow for a dynamic user experience, wherein users may be able to visualize data that is generated by the SDIN. In one or more embodiments, NGINZ web server 414 may communicate with an interface 444 and react web allocation. In one or more embodiments, sub instances 412 may operate within a larger framework of SDIN core 440. In one or more embodiments, sub instances 412 may include specialized unit that contribute to the functionality and scalability of the network. In one or more embodiments, sub instances 412 may include microservices within the SDIN core, dedicated processing units, API end points and/or the like. In one or more embodiments, sub instances 412 may include container orchestrators 416 which are tasked with the deployment, management and/or the like of containerized applications. In one or more embodiments, applications or software may be contained within containers wherein container orchestrator 416 may help manage containers effectively.

With continued reference to FIG. 4, SDIN core 440 may include an internal message bus 426. In one or more embodiments, internal message bus 426 may facilitate the exchange of messages or data between various components of SDIN core 440. In one or more embodiments, internal message bus may allow for communication between service managers 428, multi-module managers 424 and/or module APIs 430. In one or more embodiments, Module APIs 430 allow for modules to second and receive data between one another. Modules can call functions or services provided by other modules which allows for increased modularity. In one or more embodiments, modules may have default module configuration 432 which refer to predefined settings and parameters that are automatically applied to modules within a system. This allows modules to operate correctly without requiring customization.

With continued reference to FIG. 4, container architecture includes SDIN mission applications 460. In one or more embodiments, SDIN missing applications include specialized applications to support operational goals of the SDIN core 440. This may include retrieval of data, the transmission of data and/or the like. In one or more embodiments, SDIN mission applications may include dynamic discovery 436 wherein the SDIN mission application 460 is configured to identify network devices dynamically and transmit back to SDIN core 440. In one or more embodiments, open source tools 434 may be used to identify network devices and communicate them back to SDIN core.

With continued reference to FIG. 4, container architecture 400 may be migrated into a Kata environment. A kata environment is an open source container runtime with light weight virtual machines that provide for work isolation using hardware utilization. In one or more embodiments, Kata containers include lightweight virtualization technology that can provide a secure and efficient way to isolate applications within a containerized environment. Unlike traditional virtual machines (VMs), Kata Containers may leverage virtual machine technology to create isolated container runtimes. In one or more embodiments, container architecture (and/or network controllers as described in reference to FIG. 1) may be integrated within Kata containers. In one or more embodiments, integration of SDIN within kata containers may allow for reduced latency, improved security, and other improvements. In a traditional model, applications run in pods and pods have their own network namespace (private network environment). Pods then contain to an external network using virtual ethernet pairs. As a result, there may be latency as data must reveal through multiple network layers before it reaches its destination. In one or more embodiments, in a Kata environment, tap devices may be used in lieu of veth pairs. In one or more embodiments, tap devices may act as direction connection for pods to a host network. As a result, separate network namespace are not needed, and data may be transferred quicker.

Figure 5:
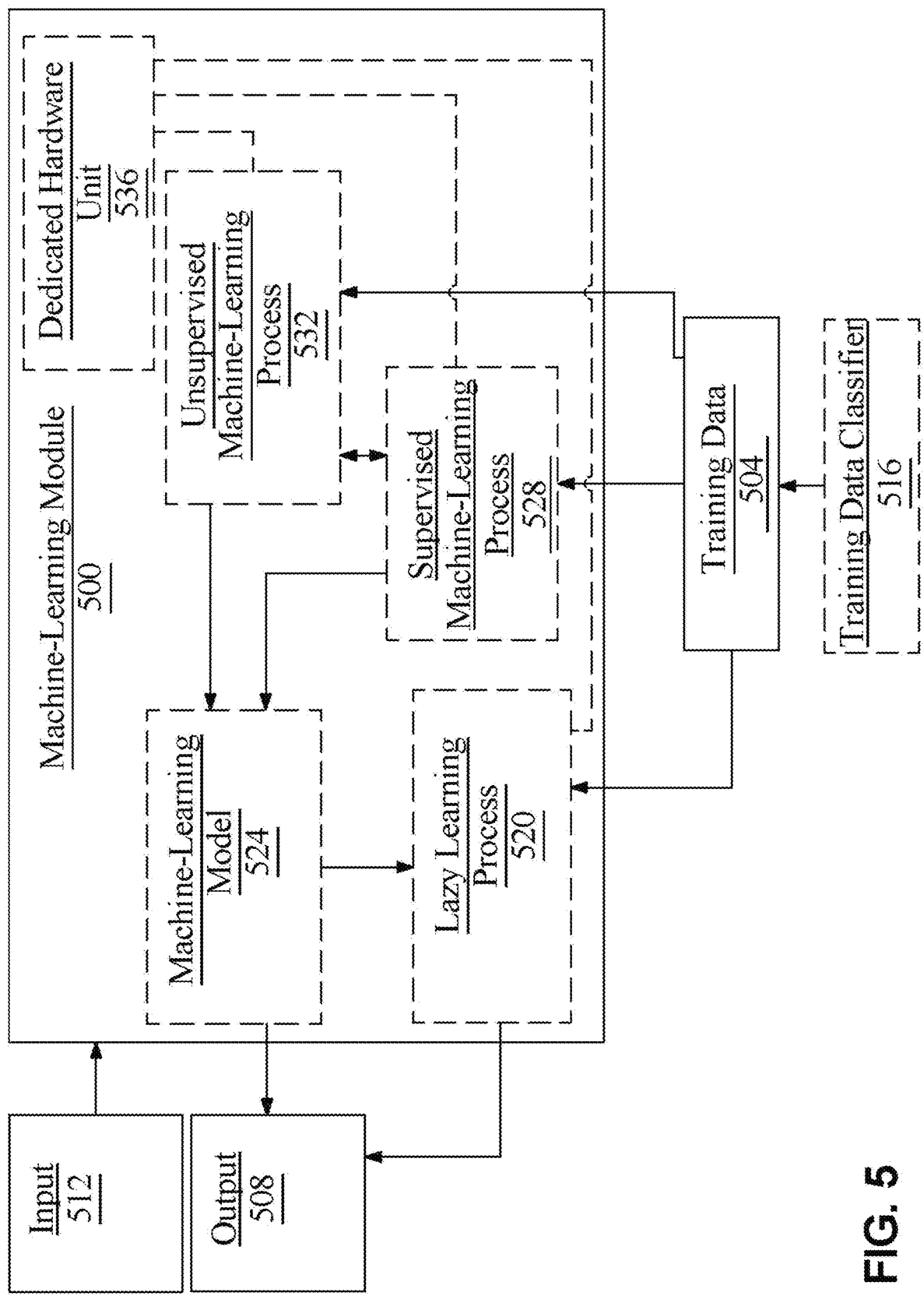
FIG. 5 illustrates a block diagram of an exemplary machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, input data may include node metadata and output data may include compatible network devices (compatible non-SDN nodes).

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to communication networks and/or groupings of communication networks, capabilities, and the like. For example, and without limitation, network devices may be classified based on the particular communication network in which data is being routed on. Continuing, training data classified to a cellular network may generate routing paths for cellular network.

Still referring to FIG. 5, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation o of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include node metadata as described above as inputs, compatible network devices as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
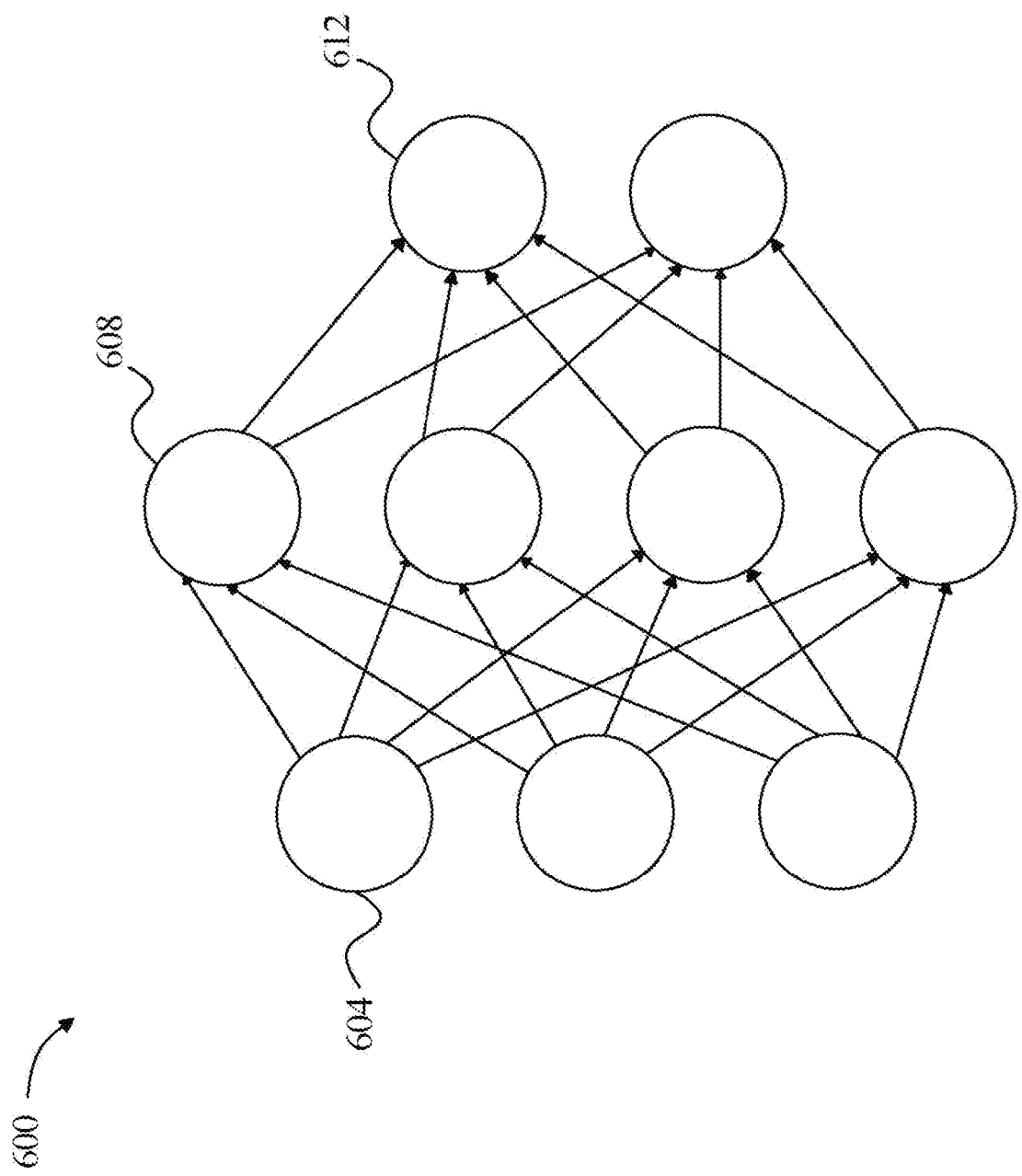
FIG. 6 illustrates a diagram of an exemplary neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
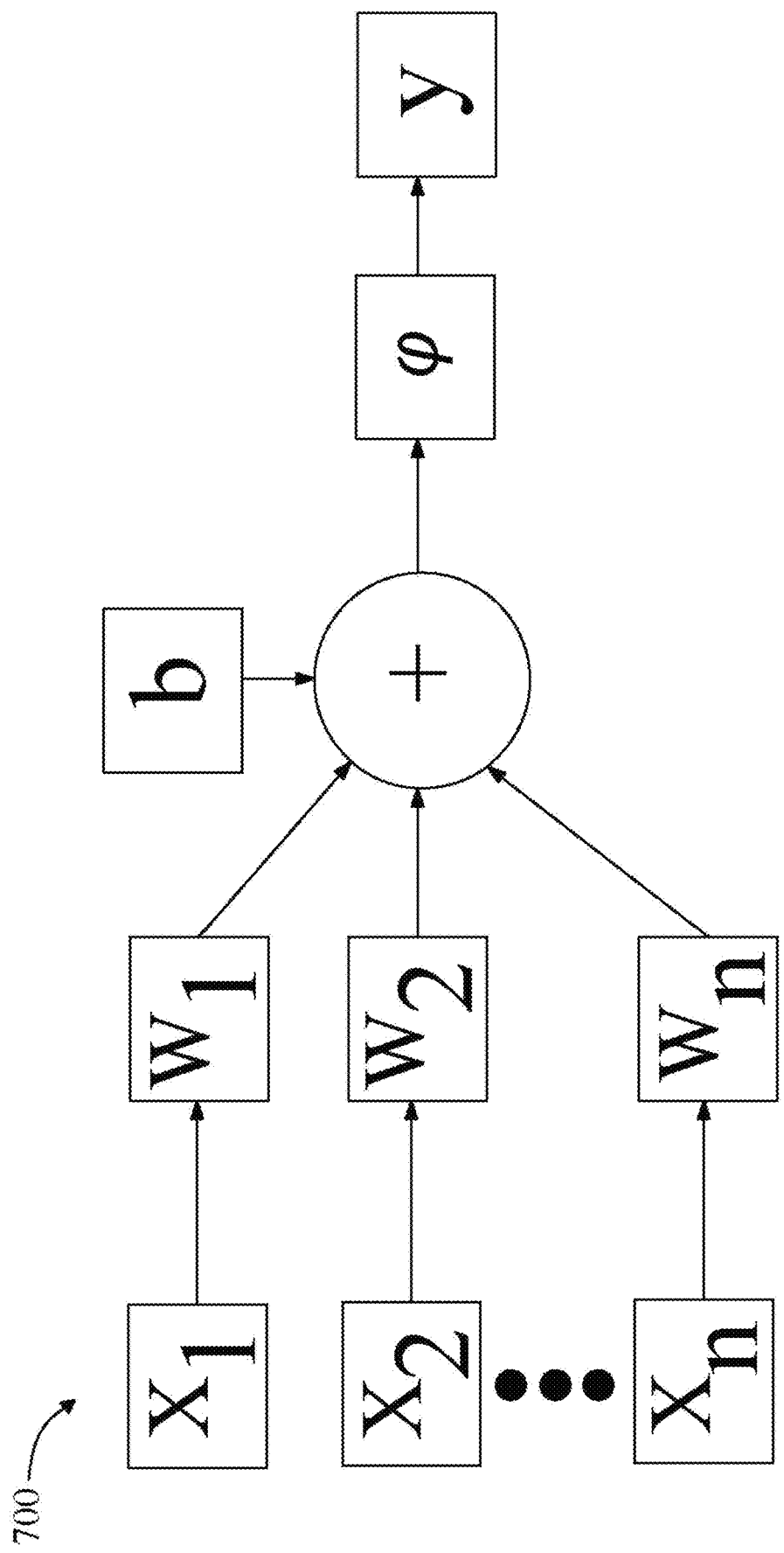
FIG. 7 illustrates a block diagram of an exemplary node in a neural network.

Referring now to FIG. 7 an exemplary embodiment of a node 700 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
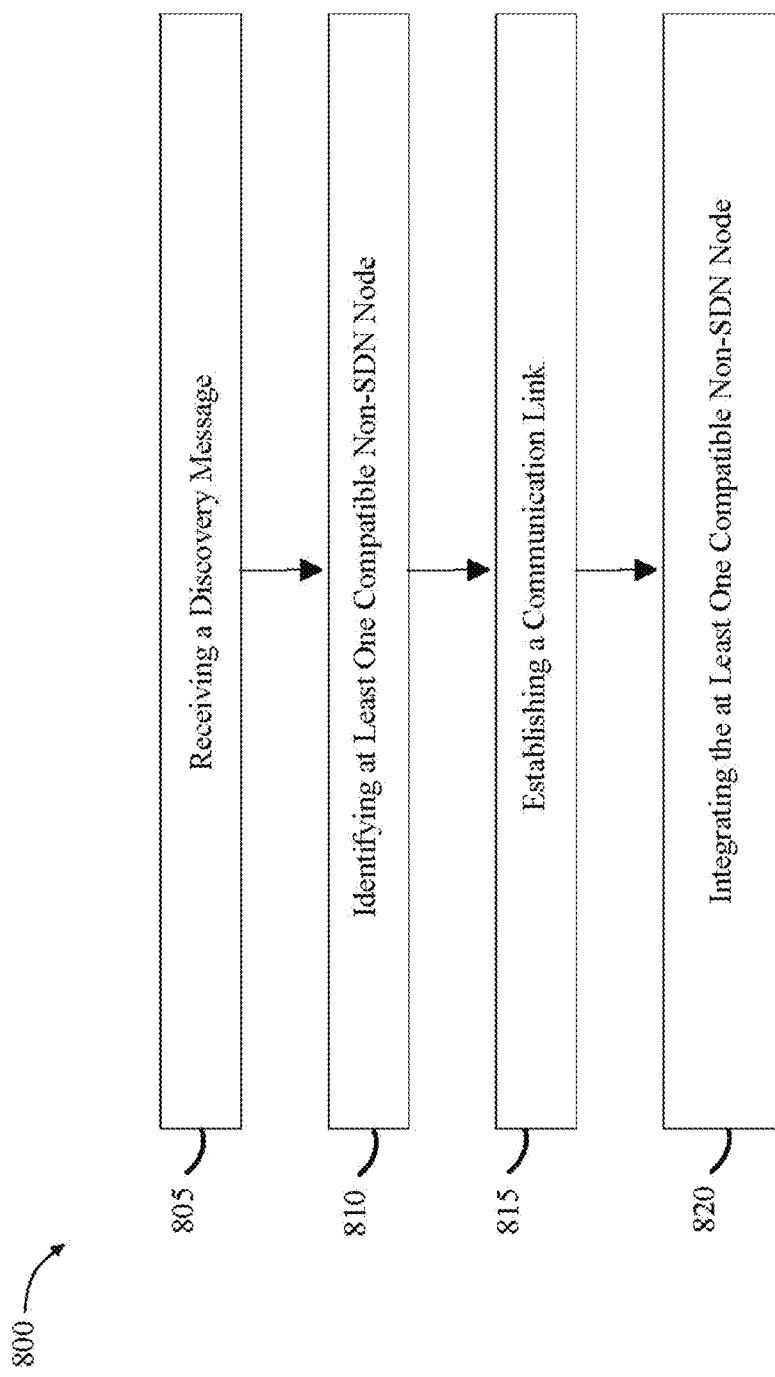
FIG. 8 illustrates a flow diagram of an exemplary method for discovering and linking software-defined networking (SDN) node and non-SDN node in a communication network.

Referring now to FIG. 8, a flow diagram of an exemplary method 800 for discovering and linking software-defined networking (SDN) node and non-SDN node in a communication network in operating environments. Method 800 contains a step 805 of receiving, using at least a processor, a discovery message from a plurality of non-SDN nodes, wherein the discovery message comprises node metadata related to the plurality of non-SDN nodes. In some embodiments, the plurality of non-SDN node may include radios that support a SDN-compatible protocol. In some embodiments, the SDN-compatible protocol may comply with method agreement (STANAG) 4586. In some embodiments, the discovery message may include a message 2261 from the STANAG 4586. In some embodiments, receiving the discovery message may include receiving the discovery message over a multicast address. In some embodiments, the plurality of non-SDN node may be configured for robotics and autonomous command and control (RAC2). These may be implemented as reference to FIGS. 1-8.

With continued reference to FIG. 8, method 800 contains a step 810 of identifying, using the at least a processor, at least one compatible non-SDN node from the plurality of non-SDN nodes by an SDN node based on the discovery message. This may be implemented as reference to FIGS. 1-8.

With continued reference to FIG. 8, method 800 contains a step 815 of establishing, using the at least a processor, a communication link between the SDN node and the at least one compatible non-SDN node. In some embodiments, the communication link may include a Link 16 protocol. In some embodiments, establishing the communication link may include determining a routing path between the SDN node and the at least one compatible non-SDN node. In some embodiments, establishing the communication link may include transmitting, by the SDN node, a response to the at least one compatible non-SDN node as a function of the discovery message. These may be implemented as reference to FIGS. 1-8.

With continued reference to FIG. 8, method 800 contains a step 820 of integrating, using the at least a processor, the at least one compatible non-SDN node into a communication network by a network controller. In some embodiments, integrating the at least one compatible non-SDN node may include authenticating the at least one compatible non-SDN node and registering the at least one compatible non-SDN node with the network controller. These may be implemented as reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
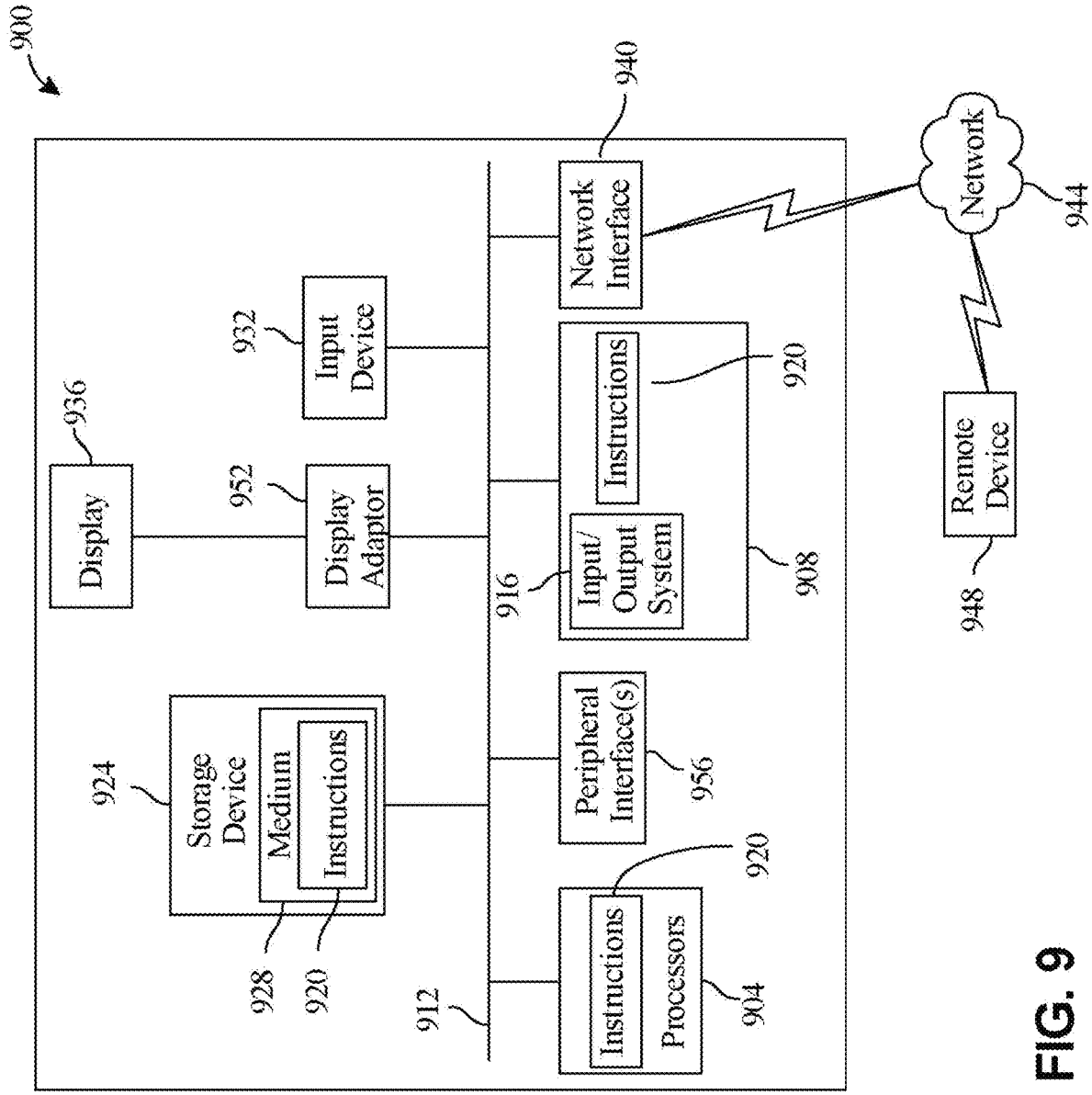
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and memory 908 that communicate with each other, and with other components, via a bus 912. Bus 912 may include any of several types of bus structures including, but not limited to, memory bus, memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatus according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for discovering and linking software-defined networking (SDN) node and non-SDN node in a communication network, the apparatus comprising:
 at least a processor; and
 a memory communicatively connected to the at least a processor, wherein the memory contains instructions configuring the at least a processor to:
  receive, from a plurality of non-SDN nodes, a discovery message, wherein the discovery message comprises node metadata related to the plurality of non-SDN nodes, wherein the plurality of non-SDN node comprises radios that support a SDN-compatible protocol that complies with standardization agreement (STANAG) 4586, and the discovery message comprises a message 2261 from the STANAG 4586;

identify, by an SDN node, at least one compatible non-SDN node from the plurality of non-SDN nodes based on the discovery message;

establish a communication link between the SDN node and the at least one compatible non-SDN node; and integrate, using a network controller, the at least one compatible non-SDN node into a communication network.

2. The apparatus of claim 1, wherein receiving the discovery message comprises receiving the discovery message over a multicast address.

3. The apparatus of claim 1, wherein the plurality of non-SDN node is configured for robotics and autonomous command and control (RAC2).

4. The apparatus of claim 1, wherein the communication link comprises a Link 16 protocol.

5. The apparatus of claim 1, wherein establishing the communication link comprises determining a routing path between the SDN node and the at least one compatible non-SDN node.

6. The apparatus of claim 1, wherein establishing the communication link comprises transmitting, by the SDN node, a response to the at least one compatible non-SDN node as a function of the discovery message.

7. The apparatus of claim 1, wherein integrating the at least one compatible non-SDN node comprises:
  authenticating the at least one compatible non-SDN node; and
  registering the at least one compatible non-SDN node with the network controller.

8. A method for discovering and linking software-defined networking (SDN) node and non-SDN node in a communication network, the method comprising:
  receiving, using at least a processor, a discovery message from a plurality of non-SDN nodes, wherein the discovery message comprises node metadata related to the plurality of non-SDN nodes, wherein the plurality of non-SDN node comprises radios that support a SDN-compatible protocol that complies with standardization agreement (STANAG) 4586, and the discovery message comprises a message 2261 from the STANAG 4586;

identifying, using the at least a processor, at least one compatible non-SDN node from the plurality of non-SDN nodes by an SDN node based on the discovery message;

establishing, using the at least a processor, a communication link between the SDN node and the at least one compatible non-SDN node; and integrating, using the at least a processor, the at least one compatible non-SDN node into a communication network by a network controller.

9. The method of claim 8, wherein receiving the discovery message comprises receiving the discovery message over a multicast address.

10. The method of claim 8, wherein the plurality of non-SDN node is configured for robotics and autonomous command and control (RAC2).

11. The method of claim 8, wherein the communication link comprises a Link 16 protocol.

12. The method of claim 8, wherein establishing the communication link comprises determining a routing path between the SDN node and the at least one compatible non-SDN node.

13. The method of claim 8, wherein establishing the communication link comprises transmitting, by the SDN node, a response to the at least one compatible non-SDN node as a function of the discovery message.

14. The method of claim 8, wherein integrating the at least one compatible non-SDN node comprises:
  authenticating the at least one compatible non-SDN node; and
  registering the at least one compatible non-SDN node with the network controller.

\* \* \* \* \*